United States Patent [19]

Sato et al.

[11] Patent Number: 4,833,544
[45] Date of Patent: May 23, 1989

[54] IMAGE PROCESSING APPARATUS

[75] Inventors: Yuichi Sato; Tokuichi Tsunekawa; Akira Hiramatsu, all of Yokohama; Makoto Katsuma, Wako; Shigeki Yamada; Takeshi Kobayashi, both of Yokohama, all of Japan

[73] Assignee: Canon Kabushiki Kaisha, Tokyo, Japan

[21] Appl. No.: 945,694

[22] Filed: Dec. 23, 1986

[30] Foreign Application Priority Data

Dec. 26, 1985 [JP] Japan ................... 60-294459

[51] Int. Cl.$^4$ ............................................. H04M 1/04
[52] U.S. Cl. .................................... 358/287; 358/215
[58] Field of Search ................. 358/287, 77, 214, 215, 358/227

[56] References Cited

U.S. PATENT DOCUMENTS 4,423,439 12/1983 Watamabe ........................... 358/77
4,663,672 5/1987 Sakamoto ........................... 358/294

Primary Examiner—Edward L. Coles, Sr.
Attorney, Agent, or Firm—Fitzpatrick, Cella, Harper & Scinto

[57] ABSTRACT

An image processing apparatus is capable of reading an original image with an arbitrary image magnification, by projecting an original image onto a linear image sensor through an optical system of a variable image magnification, and moving the original image with respect to the image sensor with a speed corresponding to the selected image magnification of the optical system.

11 Claims, 3 Drawing Sheets

IMAGE PROCESSING APPARATUS

BACKGROUND OF THE INVENTION

1. Field of the Invention

The present invention relates to an image processing apparatus, more particularly an image reading apparatus for reading by scanning an original image such as a positive or negative film or a picture with a linear image sensor.

2. Related Background Art

There are already known image reading apparatus for reading an original image with a line sensor such as CCD. In such apparatus the image reading magnification is varied, in the main scanning direction or the reading direction of the line sensor, by skipping or interpolation of the image data, and, in sub scanning direction perpendicular to the main scanning direction, by varying the advancing speed of the original image.

However, in an enlargement of the image, such method results in a deterioration of the image quality, since the resolving power becomes lower than that in real-size image reading. Also such method results in a change in the vertical-to-horizontal ratio of the read pixel, rendering the vertical-horizontal conversion, rotation, filtering etc. of the image more difficult. Also since the sub scanning is usually controlled by a stepping motor, the control of the sub scanning speed is relatively easy if the image reading magnification is represented by a ratio of integers but is very difficult if said magnification is an irrational number.

SUMMARY OF THE INVENTION

In consideration of the foregoing, an object of the present invention is to provide an image processing apparatus not associated with the above-mentioned drawbacks.

Another object of the present invention is to provide an image processing apparatus capable of image reading with a variable image magnification and with a high image quality.

Still another object of the present invention is to provide an image reading apparatus capable of image reading with an arbitrary image magnification.

The foregoing and still other objects of the present invention will become fully apparent from the following description which is to be taken with the attached drawings.

DETAILED DESCRIPTION OF THE PREFERRED EMBODIMENTS

Figure 1:
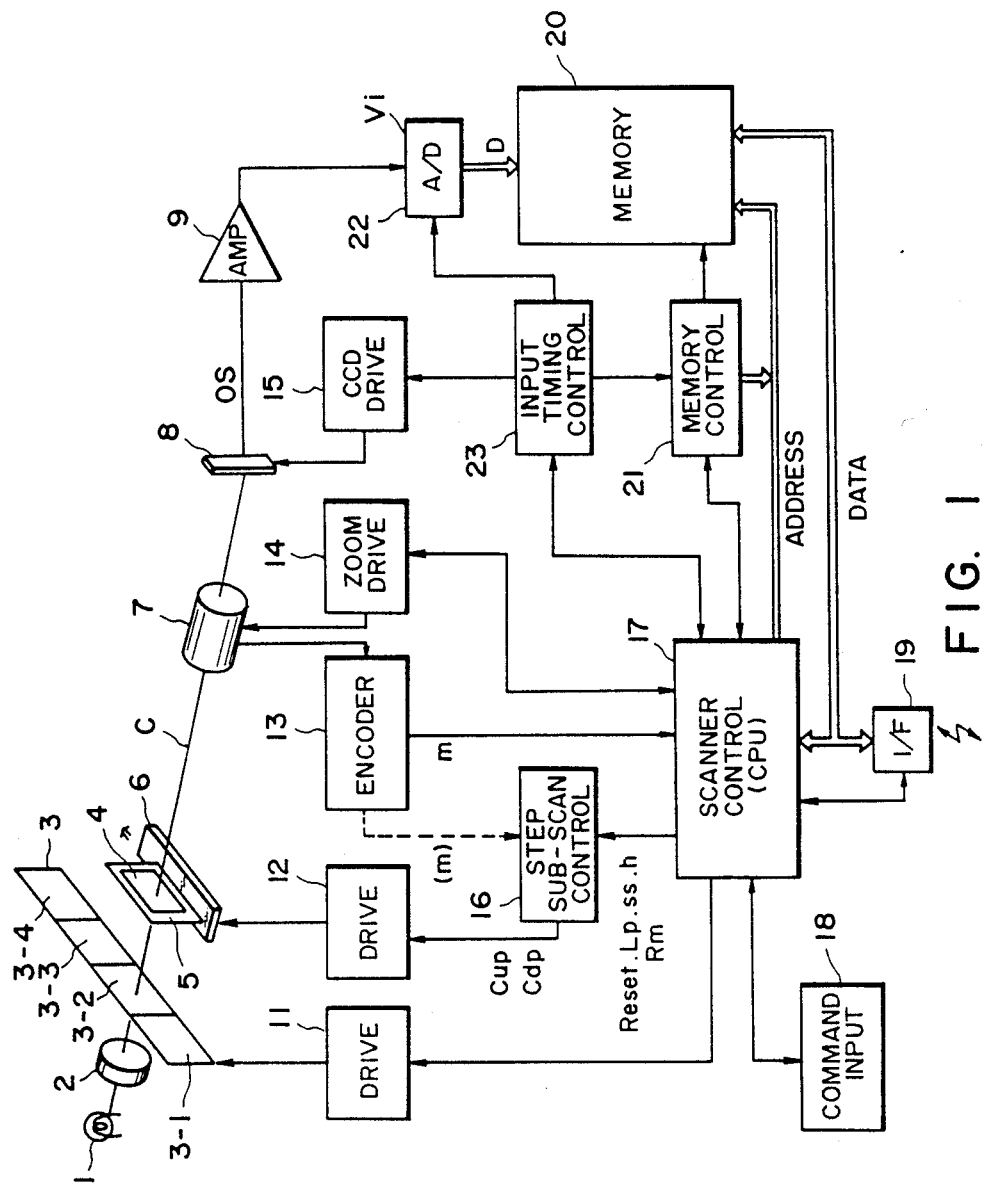
FIG. 1 is a block diagram of an image reading apparatus embodying the present invention.

FIG. 1 shows an embodiment of the present invention, wherein provided are:

1: a light source such as a halogen lamp;
2: an illuminating optical system;
3: an optical filter holder;
3-1: a first optical filter;
3-2: a second optical filter;
3-3: a third optical filter;
3-4: a fourth optical filter;
4: A 35 mm photographic film (hereinafter called original);
5: a holder for fixing the original on a stage 6;
6: a stage for moving the original 4 and the holder 5;
7: a variable-magnification projecting optical system including a zooming photographing lens;
8: a CCD line sensor;
9: an amplifier for amplifying the output OS of the CCD line sensor;
C: an optical axis of the photographing lens;
10: an image of the original on the sensor;
11: an optical filter driving circuit for mechanically changing the optical filter;
12: stage driving means including a stepping motor etc.
13: an encoder for detecting the projection magnification of the optical system;
14: a zooming driving circuit for zooming;
15: a CCD driving circuit for driving the CCD line sensor 8;
16: a sub-scan stepping control circuit for releasing drive control pulses cup, cdp for the stage 6 in response to the output of the encoder 14;
17: a scanner control circuit for the sequence control of the scanner;
18: command input means for supplying a command for operation mode etc. to the scanner control circuit;
19: an interface for transfer of data and commands to or from external equipment or a host CPU;
20: memory means;
21: memory control means for controlling the writing, reading and addressing of the memory means 20;
22: an analog-digital converter for converting an input signal Vi, obtained by amplification of the image signal OS from the CCD line sensor 8 in the amplifier 9 to a suitable input voltage range, to a digital signal D; and
23: input timing control means for synchronizing the CCD line sensor 8 with said A/D converter 22 and said memory means 20 in the storage of input image information into the memory means 20.

Now there will be explained the function of the embodiment shown in FIG. 1.

The original 4 is illuminated uniformly by the light source 1 such as a halogen lamp, through the illuminating optical system 2. In this illumination the original 4 is illuminated by the light of a particular color selected by the filter 3-j (j=1, 2, 3, 4). The scanner control circuit 17 controls the optical filter driving circuit 11 to perform said selection of the filters, thus achieving color separation. For this purpose there can be employed filters of red, green and blue, or complementary colors thereof. If the color separation is not required, there can be employed neutral density filters of suitable transmissions.

The image of thus illuminated original is projected by the lens 7 onto the CCD line sensor 8 which releases an electrical image signal OS under the control of the CCD driving circuit 15. Said image signal OS is amplified by the amplifier 9, then converted into a digital signal D by the analog-digital (A/D) converter 22 and stored in the memory 20. In this operation the CCD line sensor 8 is synchronized with the A/D converter 22 and the memory circuit 20 by the input timing control circuit 21.

The main scanning is electrically conducted by the CCD line sensor 8, and the obtained signal is temporarily stored in the memory 20.

The sub scanning is conducted by moving the original-supporting stage 6 with a stepping motor in such a manner that the projected image of the original moves in a direction perpendicular to the main scanning direction. At the start of image input, the encoder 13 detects the projected image magnification and supplies the same to the sub-scan step control circuit, and the scanner control circuit thereafter designates the pixel address or line number n in the sub scanning direction to effect the sub scanning. Two-dimensional image information is obtained in this manner.

The image data stored in the memory are sent to an external equipment or a host computer, through the interface 19.

If the capacity of said memory 20 is limited, the image data are transferred after every main scanning or after every certain number of main scannings. On the other hand, if said capacity is sufficiently large, said transfer may be conducted after the data of an entire image are entered.

Figure 2:
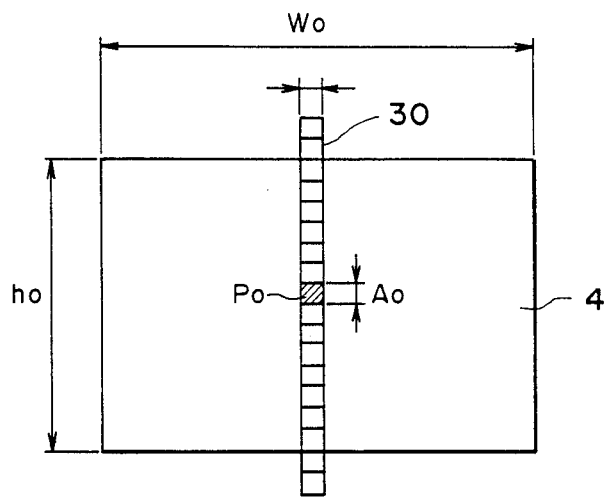
FIG. 2 is a chart showing the relation between an original image and an image projected on a sensor.
Figure 2:
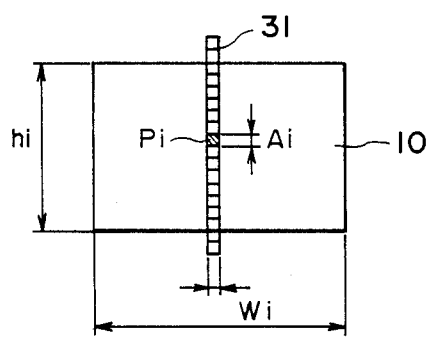

FIG. 2 shows the relationship between the original image and the image projected on the line sensor, wherein shown are:

4: an original;
Wo: lateral length of the original;
ho: vertical length of the original;
10: an original image projected on the sensor;
Wi: lateral length of the original image;
hi: vertical length of the original image;
31: an array of pixels of the sensor;
pi: a pixel of said sensor;
Ai: a pixel pitch of the sensor 8;
30: an image of the pixel array of the sensor inversely projected onto the original 4;
31: a sensor;
Po: an image of the pixel Pi inversely projected onto the original 4; and
Ao: a pixel pitch of the pixel Pi in the inversely projected image on the original 4.

Figure 3:
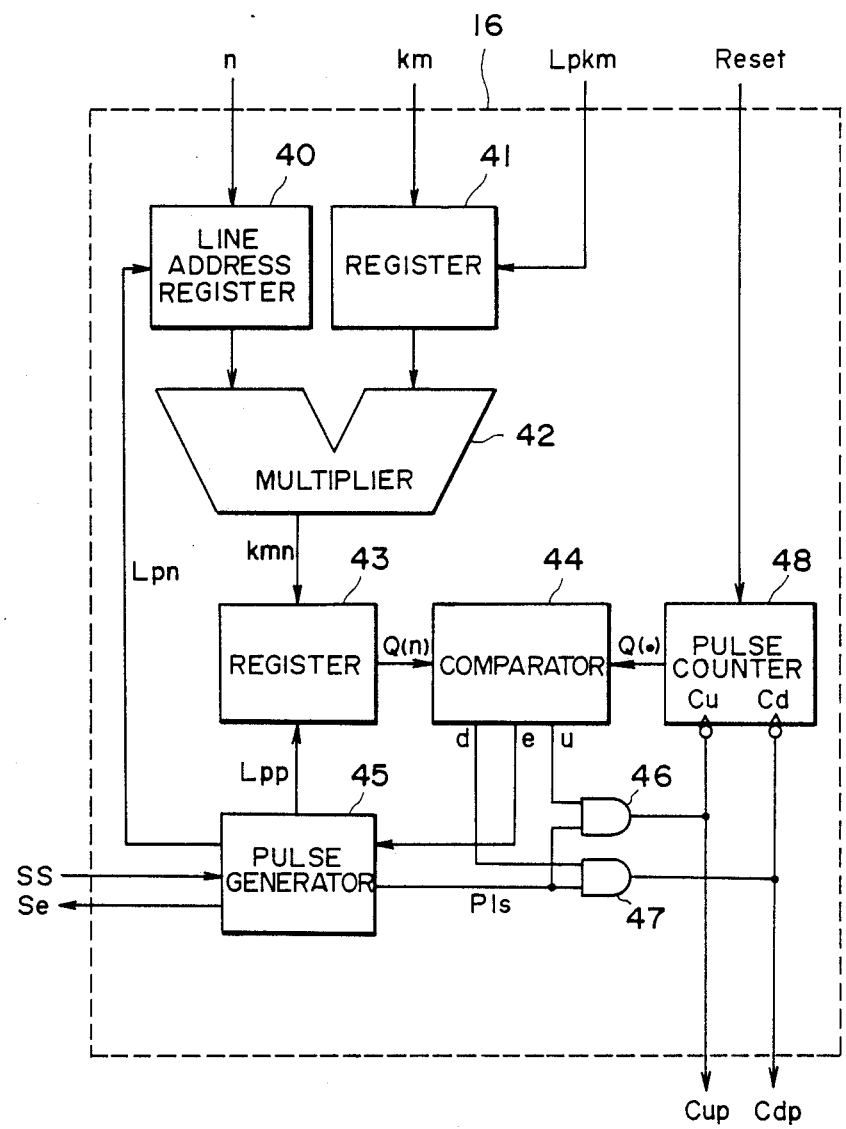
FIG. 3 is a block diagram of a step sub-scan control circuit shown in FIG. 1.

FIG. 3 shows an embodiment of the sub-scan step control circuit, wherein shown are n: a line address in the sub scanning direction instructed by the scanner control circuit;
40: a register for holding a designated line address;
Lpn: a load pulse for loading the address n into the line address register 40;
Km: a product of the projection magnification m released by the encoder 14 and a coefficient k;
k: a coefficient obtained by dividing the pixel pitch Ai of the line sensor with the amount p of stage movement by a pulse supplied to the stepping motor, so that the stage moves over a distance equal to the pixel pitch of the image sensor by k pulses;
41: a register holding the product Km;
Lpkm: a load pulse for loading the product Km into the register 41;
42: a multiplier for the multiplication of km and n;
43: a register for holding the integral portion of a product kmn of km and n;
Lpp: a load pulse for loading the integral portion Q(n) of said product kmn into the register 43;
44: a comparator for comparing the current value Q(0) of a pulse counter with the value Q(n);
e: an output signal which assumes a level "1" in case Q(n)=Q(0);
d: an output signal which assumes a level "1" in case Q(n)>Q(0);
u: an output signal which assumes a level "1" in case Q(n)<Q(0);
45: a stepping pulse generator which is activated by a sub-scan step control start signal ss, then releases a pulse Lpn for loading the value n in the line address register 40, then a pulse Lpp for loading the result of multiplication into the register 43, and, after the stabilization of the outputs e, d and u of the comparator, terminates the function if e="1", or releases pulses pls at a constant interval if e="0" until e becomes equal to "1";
46: an AND gate for obtaining a logic product of the pulse pls and the output u;
47: an AND gate for obtaining a logic product of the pulse pls and the output d;
cup: a forward pulse released by the AND gate 46 for driving the stepping motor of the stage driving circuit to advance the stage;
cdp: a reverse pulse released by the AND gate 47 for reversing the stepping motor of the stage driving circuit to reverse the stage; and
48: a pulse counter composed of an up-down counter which is reset by a signal Reset supplied at a suitable timing from the scanner control circuit and counts up the forward pulses CUP or counts down the reverse pulses cdp supplied to the stepping motor.

The circuit shown in FIG. 3 functions in the following manner.

At first the scanner control circuit 17 generates a reset signal to reset the pulse counter 48, and the position of the stage at that time is taken as a reference position. The value Q(0) of the pulse counter at that time is equal to zero. Then the scanner control circuit 17 releases the pulse number km, and then the load pulse Lpkm during the effective period of said value km to load said value km into the register 41. Then the scanner control circuit 17 releases a desired line address n, and, during the effective period thereof, releases the start signal ss. In response to said start signal ss, the sub-scan step pulse generator 45 releases, in synchronization with said signal ss, the load pulse Lpn for loading the line address n into the line address register 40. Subsequently, when the output kmn of the multiplier becomes effective when the output kmn of the multiplier becomes effective, the pulse generator 45 releases the load pulse Lpp to load the integral part of said output kmn into the register 43. The value Q(n) loaded in the register can be represented by the following equation $$Q(n) = [kmn]$$

wherein [] represent Gaussian symbols.

After the loading of Q(n) in the register 43, the pulse pls is released when the outputs d, e and u or the comparator 44 are stabilized. The pulse generation is terminated if e="1", but is otherwise continued. Said pulse pls is combined with the outputs u and d in the AND gates to generate the pulse cup or cdp respectively when the output u or d is equal to "1". The pulse cup advances the stage by one step, and increases the count of the pulse counter by one at the downshift of the pulse. The pulse cdp reverses the stage by one step, and decreases the count of the pulse counter by one at the downshift of the pulse counter 48. At the downshift of each pulse the output Q(0) of the pulse counter 48 varies so that the output of the comparator 44 also varies, but erroneous operation can be avoided by releasing the pulse pls with a suitable delay when the outputs e, d and u are stabilized. When Q(0) becomes equal to Q(n) after the release of plural pulses pls, the signal e assumes a level "1" to terminate the pulse generation and to shift the end signal se to "1", which is reset by the signal ss. The scanner control circuit 17 detects, by said end signal se, the completion of the sub-scan stepping operation.

The output Q(0) of the pulse counter 48 indicates the position, in terms of the number of pulses for the stepping motor, taking the current position of the stage as reference.

On the other hand, the value kmn is a real number indicating the target stage position in terms of the number of pulses for the stepping motor from the reference position, and Q(n) is the integral part thereof.

Also the value n is an integer indicating the line address n, and km is a real number indicating the pulse multiplication factor for converting the target line address to the target stage position.

As an example, for a pixel pitch $Ai = 11$ μm, a stage movement per pulse of $p = 1$ μm and a projection image magnification of $m = 1.30$, there is obtained:

$$km = (Ai/p)m = (11/1) \times 1.30 = 14.3$$

so that, for $n = 6, 7, 8$ $$Q(6) = [km.6] = [85.8] = 85$$

$$Q(7) = [km.7] = [100.1] = 100$$

$$Q(8) = km.8] = [114.4] = 114$$

Therefore, for achieving a sub-scanning in a range of $n = 6-8$ for every line address, there are released at first 15 pulses (Q(7)–Q(6)) and then 14 pulses (Q(8)–Q(7)).

For example n is represented by an integer of 15 bits, including an upper code bit, while km is represented by a real number with a fixed decimal point, consisting of an integral part of 4 bits and a fractional part of 12 binary bits, and the output of the multiplier stored in the register 43 consists of 20 bits including the integral part and code part.

In the present embodiment the sub-scan step control circuit is composed as a module independent from the scanner control circuit, but it is also possible to utilize the microprocessor of the scanner control circuit for conducting all or a part of the operations effected in the sub-scan step control circuit through the use of softwares.

Also in the present embodiment the encoder output m is supplied to the scanner control circuit 17 and the value km after multiplication by k is supplied to the sub-scan step control block, but it is also possible to supply the value k directly to the sub-scan step control circuit 16 for multiplication with k therein, or to supply the product of k and n to said control circuit 16.

As explained above, the foregoing embodiment employs an optical system of continuously variable image magnification and varies the moving speed of the film according to the image magnification, thereby enabling to maintain the vertical-horizontal ratio of the size of the read pixel at 1:1 or an arbitrary value and to enable image reading at an arbitrary image magnification.

Also the sub-scanning control at various image magnifications is easily achieved since the number of pulses for the sub-scanning stepping motor is always maintained as an integer regardless of the image magnification. Besides the quality of the finally obtained image signal is scarcely deteriorated since the stepping motor is usually associated with a certain error in movement.

Though the foregoing embodiment has been limited to the case of film reading, the present invention is applicable to the reading of various original images, and also to a recording apparatus with variable image magnification.

As explained in the foregoing, the vertical horizontal ratio of the size of the read pixel can be maintained constant regardless of a change in the image reading magnification, and such feature is extremely advantageous for various image signal processings. Also the quality of the image signal can be maintained as the resolving power in the main scanning direction is not deteriorated even when the image is enlarged. Also image reading can be achieved with an arbitrary image magnification.

The present invention is not limited to the foregoing embodiment but is subject to various modifications and applications within the scope and spirit of the appended claims.

What is claimed is:

1. An image scanning apparatus comprising:
   image scanning means for scanning an original image;
   moving means for moving an image scanning position of said image scanning means by using a stepping motor;
   determining means for determining numbers of pulses to be supplied to said stepping motor so as to move the image scanning position of said image scanning means from a reference position to a plurality of respective scanning positions in accordance with an image scanning magnification; and
   control means for controlling a supplying of the pulses to said stepping motor on the basis of the numbers of pulses determined by said determining means.

2. An image scanning apparatus according to claim 1, wherein said control means comprises counting means for counting the number of pulses to be supplied to said stepping motor and controls the supplying of the pulses on the basis of the numbers of pulses determined by said determining means and the number of pulses counted by said counting means.

3. An image scanning apparatus according to claim 2, wherein said control means comprises comparison means for comparing the numbers of pulses determined by said determining means with the number of pulses counted by said counting means.

4. An image scanning apparatus according to claim 1, wherein said control means enables and disables the supplying of the pulses.

5. An image scanning apparatus according to claim 1, wherein said image scanning means comprises a line sensor which scans the original image line by line.

6. An image scanning apparatus according to claim 5, wherein said moving means moves the scanning position in a direction substantially perpendicular to a main scanning direction of said line sensor.

7. An image scanning apparatus according to claim 1, further comprising generating means for generating the pulses at a constant period, and wherein said control means controls the supplying of the pulses generated by said generating means to said stepping motor.

8. An image scanning apparatus according to claim 1, wherein said scanning means scans the image on a film.

9. An image scanning apparatus according to claim 1, wherein said moving means moves the original image.

10. An image scanning apparatus according to claim 1, wherein said determining means determines the numbers of pulses to be supplied to said stepping motor on the basis of the image scanning magnification and the number of pulses used for moving the scanning position during an equimagnification reading.

11. An image scanning apparatus according to claim 1, further comprising projecting means for projecting the original image onto said scanning means with variable image magnification.

* * * * *

UNITED STATES PATENT AND TRADEMARK OFFICE
CERTIFICATE OF CORRECTION

PATENT NO. : 4,833,544

DATED : May 23, 1989

INVENTOR(S) : Yuichi Sato, et al.

It is certified that error appears in the above-identified patent and that said Letters Patent is hereby corrected as shown below:

AT [56] References Cited:

Change "4,423,439  12/1983  Watamabe" to
--4,423,439  12/1983  Watanabe--.

COLUMN 2:

Line 3, change "original);" to --an original);--

Line 15, change "motor" to --motor,--.

Line 28, change "mode etc." to --mode, etc.,--.

Column 4:   Line 47, delete "tive when the output kmn of the miltiplier becomes"

Line 48, change "effective," to --tive,--.

Line 55, change "wherein ☐ represent" to --wherein [ ] represent--.

Signed and Sealed this

Twenty-fourth Day of October, 1989

*Attest:*

DONALD J. QUIGG

*Attesting Officer*   *Commissioner of Patents and Trademarks*